US008806514B2

(12) United States Patent
Ohata et al.

(10) Patent No.: US 8,806,514 B2
(45) Date of Patent: Aug. 12, 2014

(54) DATA CONTROL DEVICE, DATA CONTROL METHOD, AND COMPUTER-READABLE MEDIUM

(75) Inventors: Maki Ohata, Tokyo (JP); Tomohiro Nakagawa, Tokyo (JP); Kazuhisa Sekine, Tokyo (JP); Ken Ohta, Tokyo (JP); Hiroshi Inamura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 919 days.

(21) Appl. No.: 12/948,137

(22) Filed: Nov. 17, 2010

(65) Prior Publication Data

US 2011/0131179 A1    Jun. 2, 2011

(30) Foreign Application Priority Data

Nov. 30, 2009  (JP) ................................. 2009-272380
Aug. 3, 2010   (JP) ................................. 2010-174567

(51) Int. Cl.
*G06F 9/46* (2006.01)
*G06F 13/00* (2006.01)
*G06F 3/048* (2013.01)
*G06F 7/04* (2006.01)

(52) U.S. Cl.
USPC .............. 719/329; 719/319; 715/770; 726/26

(58) Field of Classification Search
None
See application file for complete search history.

(56) References Cited

U.S. PATENT DOCUMENTS

| 2006/0155821 A1* | 7/2006 | Pichetti et al. ................. 709/213 |
| 2009/0063869 A1* | 3/2009 | Kohavi et al. ................. 713/189 |
| 2009/0193524 A1* | 7/2009 | Shoji et al. ..................... 726/27 |
| 2009/0319909 A1* | 12/2009 | Hsueh et al. ................... 715/740 |
| 2009/0328033 A1* | 12/2009 | Kohavi et al. ................... 718/1 |

FOREIGN PATENT DOCUMENTS

| CN | 101583940 A | 11/2009 |
| JP | 2008-217449 | 9/2008 |
| JP | 2009026294 A | 2/2009 |
| JP | 2009026228 | 5/2009 |
| JP | 2009026294 | 5/2009 |
| JP | 2009230587 A | 10/2009 |
| WO | 2007083299 A2 | 7/2007 |
| WO | 2007083300 A2 | 7/2007 |

OTHER PUBLICATIONS

European Patent Application No. 10192529.5-2211 / 2339466; EP Search Report Dated Oct. 13, 2011.
Office Action from corresponding Japanese Patent Application 2010-174567 dated Mar. 12, 2013.

(Continued)

*Primary Examiner* — Qing Wu
(74) *Attorney, Agent, or Firm* — MKG, LLC

(57) ABSTRACT

A data control device includes: an execution unit that executes, as an active runtime environment, one of a plurality of runtime environments each provided with an individual clipboard used for data reading and writing; a switching unit that switches the active runtime environment; a decision unit that, when the active runtime environment is switched by the switching unit, decides whether an item of data written to a clipboard of a runtime environment that is active before the switching should be copied to a clipboard of a runtime environment that will become active after the switching, by referring to an attribute of at least one of the runtime environment that is active before the switching and the runtime environment that will become active after the switching; and a management unit that manages copying of the item of data between the clipboards based on the decision made by the decision unit.

12 Claims, 5 Drawing Sheets

(56) References Cited

OTHER PUBLICATIONS

European Patent Application No. 10192529.5; Partial EP Search Report dated Nov. 28, 2011.
European Patent Application No. 10192529.5; Examination Report dated Dec. 2, 2011.
First Notification of Office Action issued in Chinese Patent Application No. 201010573092.4 issued on Jan. 31, 2013.
Partial European Search Report dated Feb. 21, 2012; issued in conjunction with European Patent Application No. 10192529.5.
Examination Report dated Feb. 27, 2012; issued in conjunction with European Patent Application No. 10192529.5.
Office Action from corresponding Chinese Patent Application No. 201010573092.4, dated Sep. 16, 2013.

* cited by examiner

FIG. 3

| COPY SOURCE | COPY DESTINATION | PERMISSION/PROHIBITION OF COPYING |
|---|---|---|
| E1 | E2 | PROHIBITED |
| E1 | E3 | PROHIBITED |
| E2 | E1 | PERMITTED |
| E2 | E3 | PROHIBITED |
| E3 | E1 | PERMITTED |
| E3 | E2 | PERMITTED |

FIG. 4A

| RUNTIME ENVIRONMENT | FLAG |
|---|---|
| 1 | (FOR E2) 0 |
|   | (FOR E3) 1 |

FIG. 4B

| RUNTIME ENVIRONMENT | FLAG |
|---|---|
| 3 | (FOR E1) 1 |
|   | (FOR E2) 1 |

FIG. 5

| FLAG |
|---|
| (FOR E2) 0 |
| (FOR E3) 1 |

STATE INFORMATION OF E1

| FLAG |
|---|
| (FOR E1) 1 |
| (FOR E3) 0 |

STATE INFORMATION OF E2

| FLAG |
|---|
| (FOR E1) 1 |
| (FOR E2) 1 |

STATE INFORMATION OF E3

FIG. 7

| COPY SOURCE | COPY DESTINATION | PERMISSION/PROHIBITION OF COPYING |
|---|---|---|
| E1 | E2 | PROHIBITED |
| E1 | E3 | PROHIBITED |
| E2 | E1 | PERMITTED |
| E2 | E3 | PERMITTED (WITH CONDITION) |
| E3 | E1 | PERMITTED |
| E3 | E2 | PERMITTED |

DATA CONTROL DEVICE, DATA CONTROL METHOD, AND COMPUTER-READABLE MEDIUM

CROSS-REFERENCE TO RELATED APPLICATIONS

This application is based on and claims priority under 35 U.S.C. 119 from Japanese Patent Application No. 2009-272380, which was filed on Nov. 30, 2009, and Japanese Patent Application No. 2010-174567, which was filed on Aug. 3, 2010.

TECHNICAL FIELD

The present invention relates to management of data on a clipboard.

BACKGROUND

A technology for prevention of information leakage via a clipboard is known. For example, JP2008-217449A discloses a remote control device in which, when an application for remote-controlling a computer is running in the foreground, use of a clipboard is prohibited.

SUMMARY

In cases where a plurality of runtime environments can be used interchangeably and each runtime environment is provided with an individual clipboard, it may be desirable that an item of data written to a clipboard of one runtime environment can be used in other runtime environments. In such a case, if copying of data between any of the clipboards is permitted, a risk of information leakage increases. On the other hand, if copying of data between any of the clipboards is prohibited, a user's convenience is sacrificed. Further, if each item of data is copied between the clipboards when it is unknown whether the item of data will be used, an amount of data communicated between the clipboards may be more than is required.

In view of the above background, an object of the present invention is to prevent information leakage without sacrificing convenience for users in a case where a plurality of runtime environments can be used interchangeably.

In one aspect of the present invention, there is provided a data control device comprising: an execution unit that executes, as an active runtime environment, one of a plurality of runtime environments each provided with an individual clipboard used for data reading and writing; a switching unit that switches the active runtime environment; a decision unit that, when the active runtime environment is switched by the switching unit, decides whether an item of data written to a clipboard of a runtime environment that is active before the switching should be copied to a clipboard of a runtime environment that will become active after the switching, by referring to an attribute of at least one of the runtime environment that is active before the switching and the runtime environment that will become active after the switching; and a management unit that manages copying of the item of data between the clipboards based on the decision made by the decision unit.

In a preferred embodiment, the decision unit may refer to an attribute of an application that wrote the item of data to the clipboard of the runtime environment that is active before the switching, instead of or in addition to referring to the attribute of the runtime environment that is active before the switching.

In another preferred embodiment, the decision unit may make the decision by referring to a combination of an attribute of the runtime environment that is active before the switching and an attribute of the runtime environment that will become active after the switching.

In yet another preferred embodiment, it is possible that when a predetermined item of data written to a first clipboard of a first runtime environment is copied to a second clipboard of a second runtime environment, the management unit records that the predetermined item of data is copied to the second clipboard, and in a case where the active runtime environment is switched after the copying of the predetermined item of data, and the runtime environment that is active before the switching is the second runtime environment while the runtime environment that will become active after the switching is the first runtime environment, the copying of the predetermined item of data from the second clipboard of the second runtime environment to the first clipboard of the first runtime environment is not performed.

In yet another preferred embodiment, the management unit may write the item of data written to the clipboard of the runtime environment that is active before the switching to another memory area before the decision made by the decision unit, and may write the item of data written to the other memory area to the clipboard of the runtime environment that will become active after the switching if the decision means decides that the item of data written to the clipboard of the runtime environment that is active before the switching should be copied to the clipboard of the runtime environment that will become active after the switching.

In yet another preferred embodiment, in a case where the switching unit switches the active runtime environment in response to an operation performed by a user, the management unit may perform the copying of the item of data written to the clipboard of the runtime environment that is active before the switching to the clipboard of the runtime environment that will become active after the switching, irrespective of the decision made by the decision unit.

In yet another preferred embodiment, before performing the copying of the item of data written to the clipboard of the runtime environment that is active before the switching to the clipboard of the runtime environment that will become active after the switching, the management unit may request confirmation from a user of permission for the copying. In such a case, the management unit may decide whether to request confirmation from a user of permission for the copying, based on a combination of an attribute of the runtime environment that is active before the switching and an attribute of the runtime environment that will become active after the switching.

In yet another preferred embodiment, the execution unit may execute the active runtime environment and a non-active runtime environment, and the management unit may prohibit copying of data between a clipboard of the non-active runtime environment and a clipboard of another runtime environment.

In another aspect of the present invention, there is provided a data control method comprising the steps of: executing, as an active runtime environment, one of a plurality of runtime environments each provided with an individual clipboard used for data reading and writing; switching the active runtime environment; when the active runtime environment is switched, determining whether an item of data written to a clipboard of a runtime environment that is active before the switching should be copied to a clipboard of a runtime environment that will become active after the switching, by referring to an attribute of at least one of the runtime environment that is active before the switching and the runtime environment that will become active after the switching; and managing copying of the item of data between the clipboards based on the decision made by the step of determining.

In yet another aspect of the present invention, there is provided non-transitory computer-readable storage medium storing a program for causing a computer to execute a data control method, the method comprising the steps of: executing, as an active runtime environment, one of a plurality of runtime environments each provided with an individual clipboard used for data reading and writing; switching the active runtime environment; when the active runtime environment is switched, determining whether an item of data written to a clipboard of a runtime environment that is active before the switching should be copied to a clipboard of a runtime environment that will become active after the switching, by referring to an attribute of at least one of the runtime environment that is active before the switching and the runtime environment that will become active after the switching; and managing copying of the item of data between the clipboards based on the decision made by the step of determining.

The present invention makes it is possible to prevent information leakage without sacrificing convenience for users in a case where a plurality of runtime environments can be used interchangeably.

BRIEF DESCRIPTION OF THE DRAWINGS

Exemplary embodiments of the present invention will now be described in detail with reference to the following figures, wherein:

FIG. 3 is a diagram showing an example of decision criteria referred to by a decision unit;

FIG. 4A and FIG. 4B are diagrams each showing an example of state information;

FIG. 5 is a diagram showing another example of the state information;

FIG. 7 is a diagram showing an example of decision criteria referred to by a decision unit.

DETAILED DESCRIPTION

Figure 1:
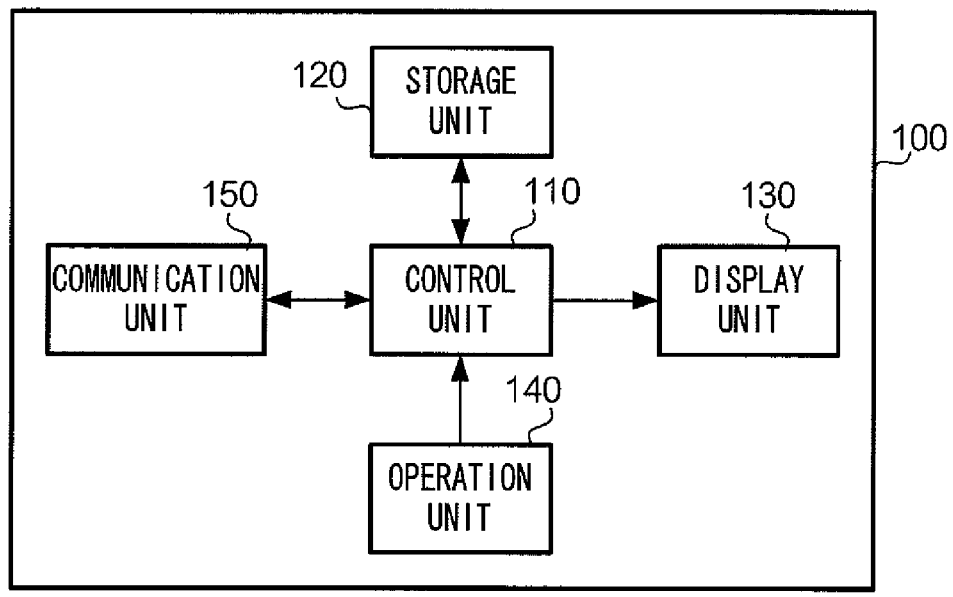
FIG. 1 is a block diagram showing a hardware configuration of an information-processing device.

FIG. 1 is a block diagram showing a hardware configuration of an information-processing device according to an exemplary embodiment of the present invention. Information-processing device 100 is a device that displays information in response to an operation performed by a user, and may be a mobile phone known as a "smartphone" (or any other similar mobile phone), for example. Information-processing device 100 can use a plurality of runtime environments.

A "runtime environment" herein is a set of programs necessary for executing applications, and performs data reading and writing by using a dedicated clipboard assigned thereto. A runtime environment may be provided for each OS (Operating System), for example, but it need not be an OS. Also, by using a virtualization technology, a runtime environment can be provided as a guest OS installed in addition to a host OS (another runtime environment).

Also, a "clipboard" is a memory area that is used for temporarily storing data, and can be accessed exclusively by a corresponding runtime environment. That is, data reading and data writing with respect to a clipboard assigned to one runtime environment cannot be performed directly by another runtime environment. Data reading and data writing with respect to a clipboard may be carried out by a cut-and-paste (or copy-and-paste) operation performed by a user, for example. However, instead of a user performing an operation, a runtime environment itself may write data to a clipboard.

As shown in FIG. 1, information-processing device 100 includes control unit 110, storage unit 120, display unit 130, operation unit 140, and communication unit 150. Control unit 110 includes a processor such as a CPU (Central Processing Unit), and a main memory. Control unit 110 executes a variety of programs for implementing an operation of information-processing device 100, and controls various units of information-processing device 100. Control unit 110 is an example of a data control device according to an aspect of the present invention. Storage unit 120 includes a storage means (a hard disk, a flash memory, or the like) serving as an auxiliary storage device, and stores data used for control conducted by control unit 110. In a case where a capacity of the memory of control unit 110 is insufficient, a part of storage unit 120 may be used as a virtual memory. Further, storage unit 120 may include a storage means, which is detachable relative to information-processing device 100, such as a memory card or the like.

Display control unit 130 includes a display means such as a liquid crystal display or the like, and displays an image according to control of control unit 110. Operation unit 140 includes input means such as keys, switches, and the like, and forwards a received operation performed by a user to control unit 110. It is to be noted that operation unit 140 may include an input means, such as a touch panel, that is overlaid integrally on display unit 130. An operation performed by a user may include an operation for switching runtime environments. Communication unit 150 includes an interface for data transmission/reception to and from an external communication means (a network, a peripheral device, etc.). For example, in a case where information-processing device is a smartphone, communication unit 150 is capable of performing data transmission/reception to and from the Internet, a mobile communication network, a wireless LAN (Local Area Network), and so on.

In the present exemplary embodiment, it is assumed that three runtime environments, runtime environments E1, E2, and E3, can be used on information-processing device 100. It is also assumed that runtime environment E1 is more secure than the other two runtime environments, and runtime environment E2 is more secure than runtime environment E3. It is to be noted, however, that these assumptions relating to runtime environments E1, E2, and E3 are made for convenience of explanation, and it is not intended that the mode for carrying out the present invention in information-processing device 100 be limited to such an embodiment.

Figure 2:
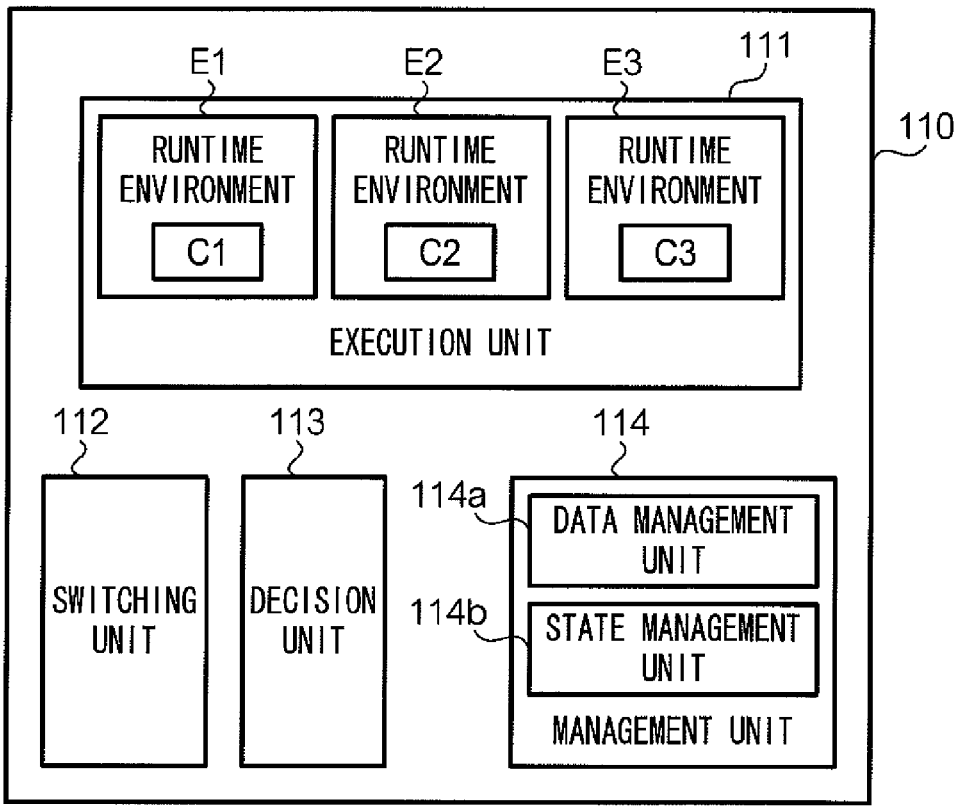
FIG. 2 is a functional block diagram showing a functional configuration provided by a control unit.

FIG. 2 is a functional block diagram showing a functional configuration provided by control unit 110. Control unit 110 executes a program to implement functions corresponding to execution unit 111, switching unit 112, decision unit 113, and management unit 114 shown in FIG. 2. Execution unit 111 executes runtime environment E1, E2, and E3 in response to an operation performed by a user. Each runtime environment E1, E2, and E3 is assigned a corresponding clipboard C1, C2, and C3. Execution unit 111 executes one of these runtime environments as an active runtime environment.

The "active runtime environment" here refers to a runtime environment that accepts an operation performed by a user, via operation unit 140. In this exemplary embodiment, the active runtime environment also is a runtime environment whose corresponding screen is displayed on display unit 130. That is, in this exemplary embodiment, a screen corresponding to a single runtime environment that is active is displayed on display unit 130, and a screen corresponding to each of the other two runtime environments is not displayed. It is to be noted, however, that a runtime environment whose corresponding screen is not displayed may be executed by control unit 110 in the background. In the following description, a state of a runtime environment that is not active will be referred to as "non-active."

Switching unit 112 switches the active runtime environment. Namely, in switching performed by switching unit 112, a runtime environment that has been active before the switching is caused to become non-active, and another runtime environment that has been non-active before the switching is caused to become active. In one case, the switching between runtime environments is conducted by switching unit 112 in response to an operation performed by a user, while in another case the switching is conducted independently of an operation performed by a user. "Another" case includes a case where a non-active runtime environment requests the switching. For example, in a case where information-processing device 100 is a smartphone and a runtime environment that executes an application controlling a telephone call is non-active, this runtime environment may request switching of its state to an active one.

Decision unit 113 decides whether copying of data between clipboards is permitted when the active runtime environment is switched by switching unit 112. Namely, when the active runtime environment is switched, decision unit 113 decides whether an item of data written to a clipboard of a runtime environment that is active before the switching should be copied to a clipboard of a runtime environment that will become active after the switching. Decision unit 113 makes this decision by referring to predetermined decision criteria. These decision criteria may be pre-stored in storage unit 120 or may be created by control unit 110 based on attributes of the runtime environments and stored in the memory before the switching of the active runtime environment. Also, the decision criteria may be preset via an operation performed by a user.

FIG. 3 is a diagram showing an example of decision criteria referred to by decision unit 113 in this exemplary embodiment. In this drawing, a "copy source" represents a runtime environment that is active before the switching, and a "copy destination" represents a runtime environment that will become active after the switching. Essentially, the example shown in FIG. 3 expresses decision criteria that prohibit copying of data to a clipboard of a runtime environment that is less secure than a runtime environment serving as a copy source (prohibition), and that permit copying of data to a clipboard of a runtime environment that is more secure than a runtime environment serving as a copy source (permission). It is to be noted that, instead of using each of the criteria for prohibition and for permission, decision unit 113 can also use only one of the criteria.

In the example shown in FIG. 3, a mode of copying with runtime environment E1 or E3 being a copy source is determined uniquely based on which of them is the copy source, irrespective of a runtime environment of the copy destination. For example, when runtime environment E1 is the copy source, copying of data between clipboards is prohibited in each of the cases where the runtime environment of the copy destination is runtime environment E2 and where the runtime environment of the copy destination is runtime environment E3. Also, when runtime environment E1 is the copy destination, copying of data between clipboards is permitted in each of the cases where the runtime environment of the copy source is runtime environment E2 and where the runtime environment of the copy source is runtime environment E3. Thus, when the above-described decision criteria are applied, in a case where one of the runtime environment of the copy source and the runtime environment of the copy destination has the highest (or lowest) security level, a mode of copying can be determined without reference to the other one of the runtime environments.

On the other hand, a mode of copying when runtime environment E2 is the copy source cannot be determined uniquely based on only the runtime environment of the copy source, but is determined based on a combination of the runtime environment of the copy source and the runtime environment of the copy destination. When runtime environment E2 is the copy source, copying of data between clipboards is prohibited in a case where the runtime environment of the copy destination is runtime environment E1, while copying of data between clipboards is permitted in a case where the runtime environment of the copy destination is runtime environment E3. Similar criteria also apply to a case where runtime environment E2 is the copy destination.

It is to be noted that the decision criteria may be defined based on an attribute other than the security level of each runtime environment, or may be defined based on both the security level and an attribute other than the security level. For example, the decision criteria may be defined based on a kind of data used by the runtime environment of the copy source, or may be defined based on compatibility of data or the like between the runtime environment of the copy source and the runtime environment of the copy destination.

Management unit 114 manages copying of data between clipboards. The management by management unit 114 is performed based on a result of a decision made by decision unit 113 in principle, but there may be exceptions. Management unit 114 includes data management unit 114*a* and state management unit 114*b*. Data management unit 114*a* is a unit that actually performs copying of data, and when copying of data is permitted, reads an item of data from the clipboard of the runtime environment of the copy source, and writes the item of data to the clipboard of the runtime environment of the copy destination. Data management unit 114*a* preferably uses a memory area (hereinafter, "shared area") that is different to any of a plurality of clipboards, to perform the data reading and writing. The shared area is a memory area that can be accessed by any runtime environment. In such a case, when data management unit 114*a* reads out an item of data written to the clipboard of the runtime environment of the copy source, it writes the item of data to the shared area first, and then writes the data written to the shared area to the clipboard of the runtime environment of the copy destination.

State management unit 114*b* stores and manages state information that represents a "state of copying" of an item of data. The "state of copying" is an indication of whether an item of data written to a clipboard has been copied from another clipboard. Management unit 114 refers to the state information before the start of copying of data, and depending on the content of the state information, does not follow the decision made by decision unit 113. That is, the state information can be a cause for the above-stated exceptions.

FIGS. 4A and 4B are each a diagram showing an example of the state information. The state information shown in FIGS. 4A and 4B indicates a runtime environment associated with a clipboard to which the most recent data writing was performed, and a state of a flag representing whether the item of data written to the clipboard is an item of data that has been copied from another clipboard. When the item of data written to the clipboard is one that has been copied from another clipboard, the flag is "0," and when it is not, the flag is "1." Further, the runtime environment associated with a clipboard on which the most recent data writing was performed is indicated by "1" if such a runtime environment is runtime environment E1, and "2" if it is runtime environment E2, and "3" if it is runtime environment E3.

An example shown in FIG. 4A represents a case in which the runtime environment associated with a clipboard to which the most recent data writing was performed is runtime environment E1, and the item of data on the clipboard thereof has been copied from the clipboard of runtime environment E2. On the other hand, an example of FIG. 4B represents a case in which the runtime environment associated with a clipboard to which the most recent data writing was performed is runtime environment E3, and the item of data on the clipboard thereof is not one that has been copied from the clipboard of runtime environment E1 or E2. The example shown in FIG. 4B appears, for example, when, in a state where runtime environment E3 is active, an item of data is written to the clipboard of runtime environment E3 in response to an operation performed by a user, which is an operation other than that for switching the active runtime environment (i.e., when a user uses the clipboard in a regular way). In the example shown in FIGS. 4A and 4B, state management unit 114b rewrites the state information each time an item of data is written to any of the plurality of clipboards.

FIG. 5 is a diagram showing another example of the state information. Unlike the example shown in FIGS. 4A and 4B, an example shown in FIG. 5 represents a case where state information is recorded for each of the runtime environments. In this example, it is indicated that an item of data that has been copied from the clipboard of runtime environment E2 is written to the clipboard of runtime environment E1, and an item of data that has been copied from the clipboard of runtime environment E3 is written to the clipboard of runtime environment E2. In the example shown in FIG. 5, when an item of data is written to a clipboard of one of the runtime environments, state management unit 114b rewrites the state information of this runtime environment, and does not rewrite the state information of the other runtime environments.

In the example shown in FIGS. 4A and 4B, the state of the flag is recorded only with respect to the runtime environment associated with a clipboard to which data was most recently written. Thus, in the example shown in FIGS. 4A and 4B, an amount of data of the state information can be reduced, though only a state of copying relating to the most recent data writing can be used. On the other hand, when the state information is recorded for each runtime environment as in the example shown in FIG. 5, the state information can be used even for an item of data that was written to a clipboard when a runtime environment was active and is retained after the runtime environment has become non-active. The present exemplary embodiment can be applied to each of the cases where an item of data written to a clipboard of a runtime environment is deleted when the runtime environment becomes non-active and where such an item of data is retained after the runtime environment has become non-active. The state information may be recorded in an appropriate mode selected depending on which of the cases the present invention is applied to.

The foregoing is a description of the configuration of information-processing device 100. With such a configuration, information-processing device 100 selectively makes one of a plurality of runtime environments active, and executes an application corresponding to the active runtime environment.

In relation to such an operation, control unit 110 logically divides a memory area into respective clipboards corresponding to the plurality of runtime environments and the aforementioned shared area, and carries out control such that a clipboard of one runtime environment cannot be accessed directly by another runtime environment. Further, information-processing device 100 receives an operation performed by a user, and switches the active runtime environment as necessary. With regard to the switching, control unit 110 determines whether an item of data written to the clipboard of the runtime environment that is active before the switching should be copied to the clipboard of the runtime environment that will become active after the switching, and based on the determination, manages copying of the item of data.

Figure 6:
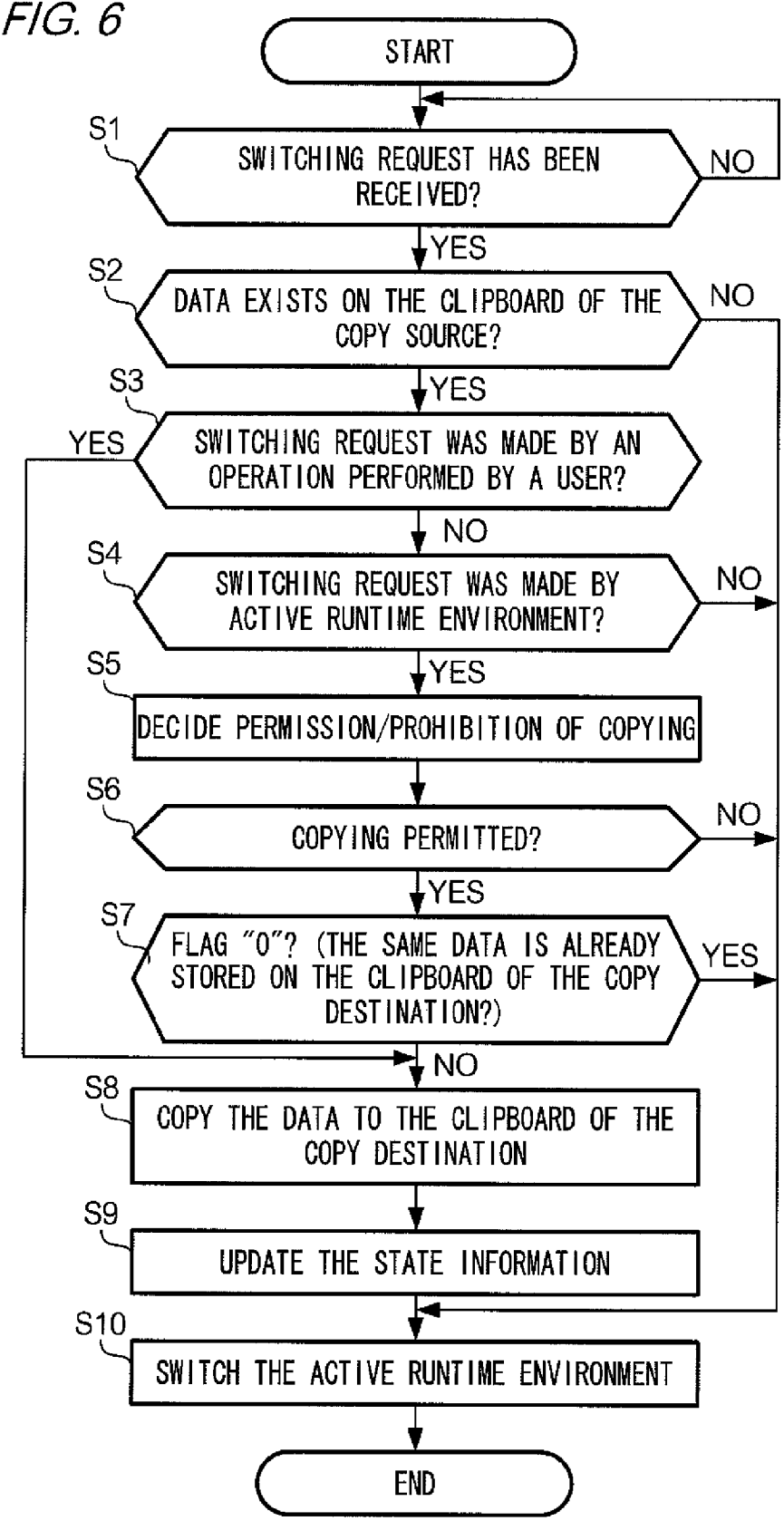
FIG. 6 is a flowchart showing a process of switching an active runtime environment.

FIG. 6 is a flowchart showing a process conducted by control unit 110 when switching of an active runtime environment is performed. In this process, control unit 110 determines whether a request for switching of an active runtime environment (hereinafter, "switching request") has been received (step S1), and if it is found that the switching request has been received, performs the subsequent process. Next, control unit 110 determines whether an item of data has been written to a clipboard of a runtime environment that is currently active, i.e., a runtime environment that is active before the switching (step S2), and if there is no item of data written to the clipboard, switches the active runtime environment without performing copying of data (step S10). This is because, in such a case, there is no data for which copying should be performed. In step S10, control unit 110 performs changing of an image(s) displayed on display unit 130 and/or any other desirable operations.

In a case where an item of data has been written to the clipboard of the runtime environment that is active before the switching, control unit 110 determines whether the switching request was made by an operation performed by a user (step S3), and if not, control unit 110 determines which of the runtime environments made the switching request (step S4). Specifically, in step S4, control unit 110 determines whether the switching request was made by the active runtime environment, and if not (i.e., the switching request was made by one of the non-active runtime environments), switches the active runtime environment without performing copying of data (step S10). This is because, in such a case, there is no explicit demand made by a user for switching of the active runtime environment, and there is a low possibility that the user will perform any operation in the runtime environment that will become active after the switching. By omitting copying of data between clipboards, information leakage can be prevented reliably, and a number of times of copying of data can be decreased.

In a case where the switching request was made by the active runtime environment, control unit 110 decides whether copying of the item of data on the clipboard is permitted based on predetermined decision criteria (step S5). In this decision, control unit 110 refers to an attribute of at least one of the runtime environment of the copy source and the runtime environment of the copy destination, and may refer to a combination of an attribute of the runtime environment of the copy source and an attribute of the runtime environment of the copy destination, as necessary.

Then, control unit 110 determines whether the decision in step S5 indicates permission of copying (step S6), and if copying is permitted, refers to the state information to determine whether the item of data written to the clipboard of the copy source is already stored on the clipboard of the copy destination (step S7). Specifically, if the flag set for the pair of the runtime environment of the copy source and the runtime environment of the copy destination is "1," i.e., the item of data on the clipboard of the copy source is not stored on the clipboard of the copy destination, control unit 110 causes the item of data on the clipboard of the copy source to be written to the clipboard of the copy destination, thereby to achieve copying between the clipboards (step S8). Thereafter, control unit 10 updates the state information to reflect the content of processing performed (step S9). "Updating" herein corresponds to rewriting of the state information, and is one mode of recording of the state information. After the copying of data and the updating of the state information have been completed, control unit 110 switches the active runtime environment (step S10), and changes an image(s) displayed on display unit 130 accordingly.

On the other hand, in a case where it is determined in step S6 that copying is not permitted or in a case where it is determined in step S7 that the flag is "0", i.e., the item of data on the clipboard of the copy source is already stored on the clipboard of the copy destination, control unit 110 only switches the active runtime environment (step S10) without performing copying of data. Owing to the determination made in step S7, it becomes possible to reduce a number of times unnecessary copying (i.e., copying of the same data) is conducted between clipboards.

It is to be noted that in a case where it is determined in step S3 that the switching request was made by an operation performed by a user, control unit 110 skips the process from step S4 to step S7, and executes the process of copying of data (step S8) and the processes thereafter. That is, in this case, control unit 110 performs copying of data irrespective of the result of a decision made in step S5. This is because, when the active runtime environment is switched in response to an explicit demand from a user, there is a high possibility that the user will perform an operation and the clipboard will be used after the switching.

As described in the foregoing, in information-processing device 100, it is possible to manage permission/prohibition of copying of data between clipboards based on at least one of a combination of a runtime environment that was active before switching of an active runtime environment and a runtime environment that becomes active after the switching. That is, in information-processing device 100, it is possible to prevent leakage of data used in a secure runtime environment (such as personal information, for example) to another runtime environment via clipboards, while allowing for data acquisition by a secure runtime environment via a clipboard of another runtime environment. Further, in information-processing device 100, it is possible to conduct control such that copying of data between clipboards of runtime environments that are used often in combination is permitted, while copying of data between clipboards of runtime environments that are not used often in combination is limited.

It is to be noted that in the present exemplary embodiment, the steps of copying of data (step S8), updating of the state information (step S9), and switching of the active runtime environment (step S10) may be performed in an arbitrary order. For example, if information-processing device 100 performs copying of data after switching of the active runtime environment, or if information-processing device 100 performs copying of data after updating of the state information, it is possible to achieve similar effects to those that can be achieved when the steps are performed in the order shown in FIG. 6.

The above-described embodiment is a mere example of how the present invention can be carried out. The above-described embodiment can be modified as described below. It is to be noted that two or more of the following modifications may be used in combination, as necessary.

Some of the steps in the flowchart shown in FIG. 6 can be omitted. For example, in a case where the state information is not used, steps S7 and S9 may be omitted. Also, if permission/prohibition of copying is decided without referring to an entity making the switching request, steps S3 and S4 may be omitted. Moreover, step S2 also is dispensable.

The decision with regard to permission/prohibition of copying in the present invention may be made by referring to an attribute of an application (hereinafter, "data-writing source application") that has written an item of data to the clipboard of the runtime environment that was active before switching of an active runtime environment, instead of referring to an attribute of the runtime environment. The "data-writing source application" here indicates an application that has generated the item of data written to the clipboard. For example, in a case where a user uses a text editor to input characters and causes the characters to be written to a clipboard by copying the same, the text editor is a data-writing source application. In this way, it is possible, for example, that when an application that handles a relatively large amount of personal information (such as an email client) is a data-writing source, copying of data written to a clipboard of one runtime environment to a clipboard of another runtime environment is not performed, while when an application that does not handle a large amount of personal information is a data-writing source, such copying of data is performed.

It is to be noted that the decision based on an attribute of the data-writing source application may be made by additionally referring to an attribute of a runtime environment that executes the application. For example, a decision criterion may be set such that, when a spreadsheet is run as a data-writing source application by a particular runtime environment, copying of data between clipboards is prohibited, and when the same spreadsheet is run by another runtime environment, copying of data between clipboards is permitted.

The management of copying in the present invention may include, after a decision with regard to permission/prohibition of copying is made based on the predetermined decision criteria, and before copying is actually performed, a step of requesting confirmation from a user with regard to permission/prohibition of copying, so that it can be determined whether to perform copying based on a user's instruction. Such a confirmation-requesting step can be realized, for example, by causing display unit 130 to display a dialog box including a question such as "Is it OK to copy the data written to the clipboard?" and allowing a user to select an answer thereto. If the user does not permit copying in the confirmation-requesting step, the active runtime environment is switched, but copying of data between clipboards is not performed, though the copying was determined as being permitted in step S5 shown in FIG. 6. Thus, in a case where the confirmation-requesting step is provided, an operation that is not in accordance with the decision result may be performed.

It is to be noted that, in a case where a means for requesting confirmation from a user is provided, the decision criteria may be adapted such that the copying modes selected based on the decision criteria include not only alternative modes ("permitted" and "prohibited"), but also a third mode "request confirmation from a user." In such a case, the aforementioned confirmation-requesting step is performed only when a decision result indicating "request confirmation from a user" is obtained.

FIG. 7 is a diagram showing an example of such decision criteria. The decision criteria shown in FIG. 7 differ from the decision criteria shown in FIG. 3, in which the decision criteria shown in FIG. 7 specify that copying of data from clipboard C2 of runtime environment E2 to clipboard C3 of runtime environment E3 is permitted with a condition. In a case where the decision criteria shown in FIG. 7 are used, control unit 110 performs the aforementioned confirmation-requesting step when runtime environment E2 is a copy source and runtime environment E3 is a copy destination, and permits copying without performing the aforementioned confirmation-requesting step when runtime environment E3 is a copy source and runtime environment E2 is a copy destination. In this way, control unit 110 can determine whether to request confirmation from a user with regard to permission/prohibition of copying of data based on a combination of a runtime environment that is active before switching of an active runtime environment and a runtime environment that will become active after the switching (i.e., based on a combination of the copy source and the copy destination).

When copying of data written to a clipboard according to the present invention is performed using a shared area, the data on the clipboard of the copy source may be written to the shared area in advance (such as prior to the decision with regard to permission/prohibition of copying, or prior to the acquisition of a switching request). In this way, it is possible to complete copying of data to the clipboard of the copy destination more quickly than in a case where copying of data from the clipboard of the copy source to the shared area and copying of data from the shared area to the clipboard of the copy destination are performed successively.

Figure 8:
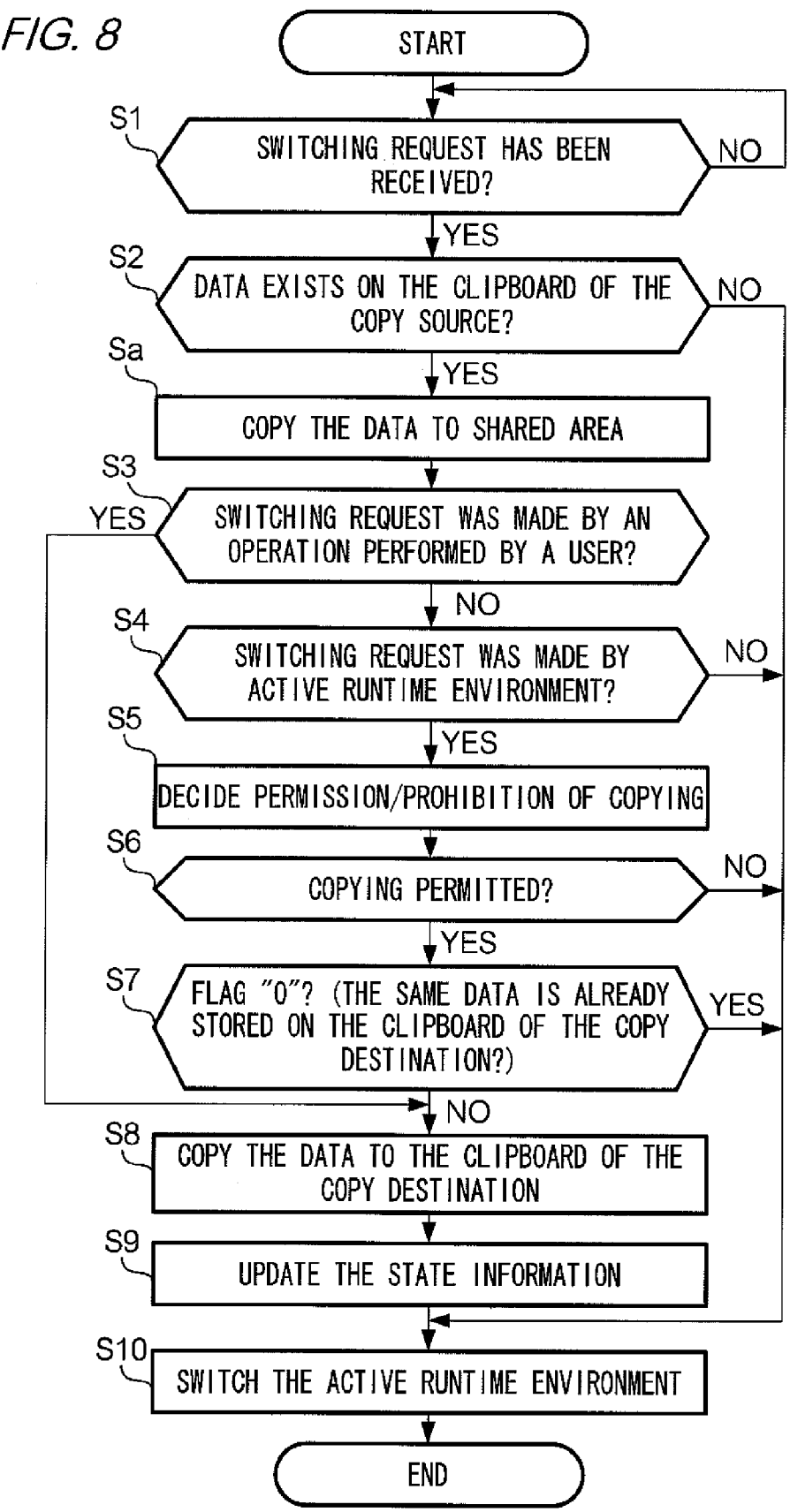
FIG. 8 is a flowchart showing a process of switching an active runtime environment.

FIG. 8 is a flowchart showing a process executed by control unit 110 in accordance with the present modified embodiment. The flowchart shown in FIG. 8 is different to that shown in FIG. 6, in which step Sa is added to the flowchart shown in FIG. 8. In step Sa (i.e., before the decision performed in step S5), control unit 110 causes the data on the clipboard of the copy source to be written to the shared area, so that the data is copied to the shared area. In this case, control unit 110 causes the data in the shared area to be written to the clipboard of the copy destination in step S8 (i.e., after the decision performed in step S5), so that the data is copied to the clipboard of the copy destination.

In a case where both an active runtime environment and a non-active runtime environment are executed, the management of copying in the present invention may include management with regard to the non-active runtime environment in addition to management with regard to the active runtime environment. The management with regard to the non-active runtime environment includes control performed so as not to permit access by a non-active runtime environment to a clipboard of another runtime environment.

For example, a non-active runtime environment can execute a process independently of an operation performed by a user (or without being noticed by a user). Therefore, a non-active runtime environment may read/write data from/to a clipboard of another runtime environment without being noticed by a user, if no measure is taken. This may lead to information leakage if such a runtime environment is relatively non-secure. To address such a problem, control unit 110 conducts control such that when a non-active runtime environment requests data reading or data writing where the non-active runtime environment is a copy destination or a copy source, copying of data is prohibited. To achieve such control, it is preferred that control unit 110 monitors whether a non-active runtime environment is executed, and whether the non-active runtime environment attempts to read or write data from or to a clipboard of another runtime environment.

In this modified embodiment, when copying of data between a clipboard of a non-active runtime environment and a clipboard of another runtime environment is performed using a shared area, control unit 110 may permit writing of data stored on the clipboard of the non-active runtime environment to the shared area or writing of data stored on the clipboard of the other runtime environment to the shared area. Namely, control unit 110 can prevent illicit copying of data by conducting control such that data stored on one of a clipboard of a non-active runtime environment and a clipboard of another runtime environment is not written to the other.

The number of runtime environments that can be executed in the present invention is not particularly limited, so long as the number is more than one. The present invention can be applied to a case where there are two runtime environments executed or a case where there are four or more runtime environments executed, to achieve similar effects to those that can be achieved in the above-described embodiment.

Also, a data control device according to the present invention may be used in an information-processing device other than a smartphone. The present invention can be applied to a communication terminal device such as a PDA (Personal Digital Assistance), a laptop computer, and so on, so long as the device is configured to be capable of executing a plurality of runtime environments having respective clipboards. Moreover, the information-processing device according to the present invention does not necessarily include the aforementioned communication unit 150.

The present invention may be embodied as a method corresponding to the above-described data control device. Also, the present invention may be embodied as a program for causing a computer (a CPU or the like) of an information-processing device to execute such a method or a storage medium, such as an optical disk, that stores the program. A program according to the present invention may be downloaded to a computer via a network such as the Internet, and installed in the computer for use.

The present invention can also be embodied as "a data control device comprising: an execution unit that executes, as an active runtime environment, one of a plurality of runtime environments each provided with an individual clipboard used for data reading and writing; a switching unit that switches the active runtime environment; and a management unit that, when the active runtime environment is switched by the switching unit, manages copying of an item of data written to a first clipboard of a runtime environment that is active before the switching to a second clipboard of a runtime environment that will become active after the switching, wherein in a case where the switching is conducted in response to an operation performed by a user, the management unit performs copying of the item of data written to the first clipboard to the second clipboard, and in a case where the switching is not conducted in response to an operation performed by a user, the management unit does not perform copying of the item of data written to the first clipboard to the second clipboard." Further, the present invention can be embodied as a program or a method corresponding to such a data control device.

What is claimed is:

1. A data control device comprising:
a control unit configured to execute a plurality of programs, the control unit comprising:
an execution unit that executes, as an active runtime environment, one of a plurality of runtime environments each provided with an individual clipboard used for data reading and writing;
a switching unit that switches the active runtime environment;
a decision unit that, when the active runtime environment is switched by the switching unit, decides whether an item of data written to a clipboard of a runtime environment that is active before the switching should be copied to a clipboard of a runtime environment that will become active after the switching, by referring to an attribute of at least one of the runtime environment that is active before the switching and the runtime environment that will become active after the switching; and a management unit that manages copying of the item of data between the clipboards based on the decision made by the decision unit.

2. The data control device according to claim 1, wherein the decision unit refers to an attribute of an application that wrote the item of data to the clipboard of the runtime environment that is active before the switching, instead of or in addition to referring to the attribute of the runtime environment that is active before the switching.

3. The data control device according to claim 1, wherein the decision unit makes the decision by referring to a combination of an attribute of the runtime environment that is active before the switching and an attribute of the runtime environment that will become active after the switching.

4. The data control device according to claim 1, wherein when a predetermined item of data written to a first clipboard of a first runtime environment is copied to a second clipboard of a second runtime environment, the management unit records that the predetermined item of data is copied to the second clipboard, and in a case where the active runtime environment is switched after the copying of the predetermined item of data, and the runtime environment that is active before the switching is the second runtime environment while the runtime environment that will become active after the switching is the first runtime environment, the copying of the predetermined item of data from the second clipboard of the second runtime environment to the first clipboard of the first runtime environment is not performed.

5. The data control device according to claim 1, wherein the management unit writes the item of data written to the clipboard of the runtime environment that is active before the switching to another memory area before the decision made by the decision unit, and writes the item of data written to the other memory area to the clipboard of the runtime environment that will become active after the switching if the decision means decides that the item of data written to the clipboard of the runtime environment that is active before the switching should be copied to the clipboard of the runtime environment that will become active after the switching.

6. The data control device according to claim 1, wherein in a case where the switching unit switches the active runtime environment in response to an operation performed by a user, the management unit performs the copying of the item of data written to the clipboard of the runtime environment that is active before the switching to the clipboard of the runtime environment that will become active after the switching, irrespective of the decision made by the decision unit.

7. The data control device according to claim 1, wherein, before performing the copying of the item of data written to the clipboard of the runtime environment that is active before the switching to the clipboard of the runtime environment that will become active after the switching, the management unit requests confirmation from a user of permission for the copying.

8. The data control device according to claim 7, wherein the management unit decides whether to request confirmation from a user of permission for the copying, based on a combination of an attribute of the runtime environment that is active before the switching and an attribute of the runtime environment that will become active after the switching.

9. The data control device according to claim 1, wherein the execution unit executes the active runtime environment and a non-active runtime environment, and the management unit prohibits copying of data between a clipboard of the non-active runtime environment and a clipboard of another runtime environment.

10. A data control method comprising the steps of:

executing, as an active runtime environment, one of a plurality of runtime environments each provided with an individual clipboard used for data reading and writing;

switching the active runtime environment;

when the active runtime environment is switched, determining whether an item of data written to a clipboard of a runtime environment that is active before the switching should be copied to a clipboard of a runtime environment that will become active after the switching, by referring to an attribute of at least one of the runtime environment that is active before the switching and the runtime environment that will become active after the switching; and managing copying of the item of data between the clipboards based on the decision made by the step of determining.

11. A non-transitory computer-readable storage medium storing a program for causing a computer to execute a data control method, the method comprising the steps of:

executing, as an active runtime environment, one of a plurality of runtime environments each provided with an individual clipboard used for data reading and writing;

switching the active runtime environment;

when the active runtime environment is switched, determining whether an item of data written to a clipboard of a runtime environment that is active before the switching should be copied to a clipboard of a runtime environment that will become active after the switching, by referring to an attribute of at least one of the runtime environment that is active before the switching and the runtime environment that will become active after the switching; and managing copying of the item of data between the clipboards based on the decision made by the step of determining.

12. A data control device comprising:

a control unit configured to execute a plurality of programs, the control unit comprising:

an execution unit that executes, as an active runtime environment, one of a plurality of runtime environments each provided with an individual clipboard used for data reading and writing; a switching unit that switches the active runtime environment; and a management unit that, when the active runtime environment is switched by the switching unit, manages copying of an item of data written to a first clipboard of a runtime environment that is active before the switching to a second clipboard of a runtime environment that will become active after the switching, wherein in a case where the switching is conducted in response to an operation performed by a user, the management unit performs copying of the item of data written to the first clipboard to the second clipboard, and in a case where the switching is not conducted in response to an operation performed by a user, the management unit does not perform copying of the item of data written to the first clipboard to the second clipboard.

* * * * *